UNITED STATES PATENT OFFICE.

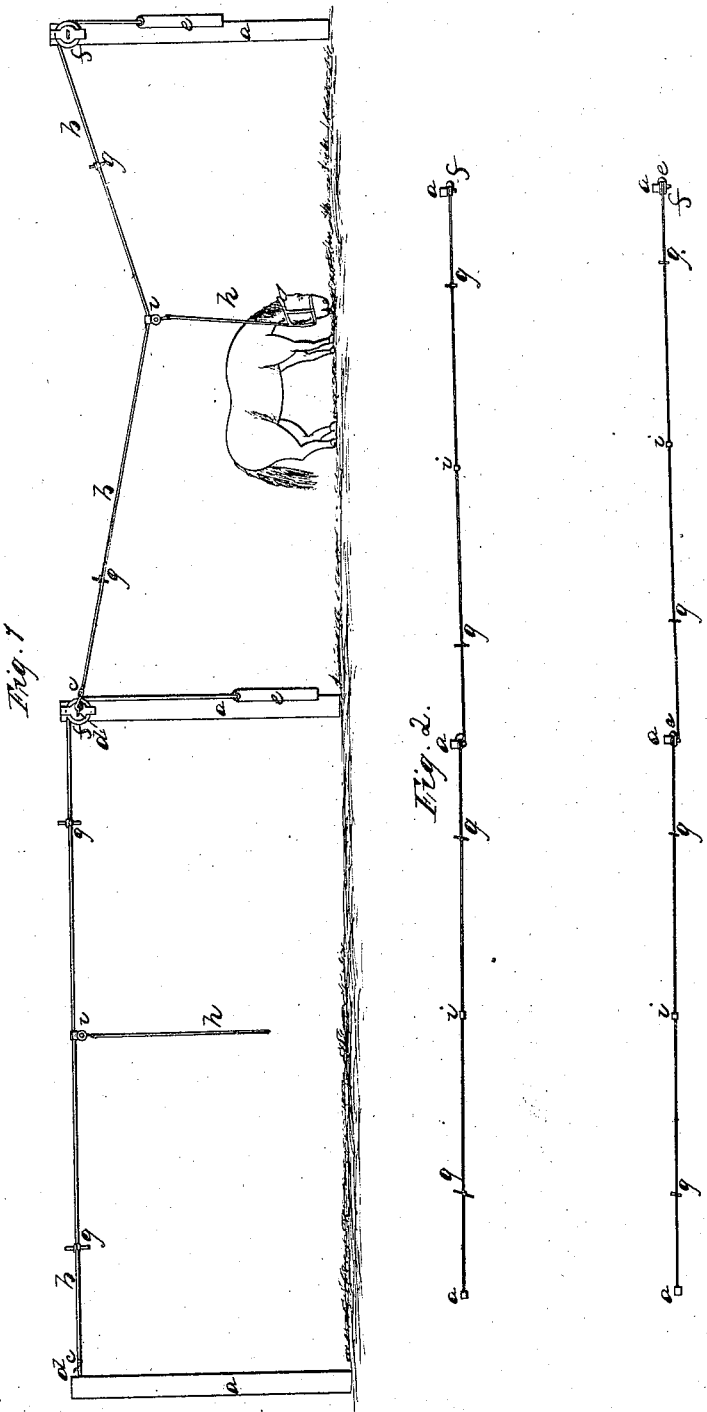

GEORGE F. JEROME, OF NORTH HEMPSTEAD, NEW YORK.

IMPROVEMENT IN TEDDERS FOR ANIMALS.

Specification forming part of Letters Patent No. 40,625, dated November 17, 1863.

*To all whom it may concern:*

Be it known that I, GEORGE F. JEROME, of North Hempstead, in the county of Queens and State of New York, have invented, made, and applied to use a certain new and useful Improvement in Tedders for Animals; and I do hereby declare the following to be a full, clear, and exact description of the said invention, reference being had to the annexed drawings, making part of this specification, wherein—

Figure 1 is an elevation of my tedder as adapted to use, the posts being larger in proportion to the space between the posts, so as to show the parts more clearly; and Fig. 2 is a plan illustrating the mode of placing the posts in the pasture.

The same letters refer to like parts.

Agriculturists are learning the disadvantages of so much fencing as is usually employed, because it is costly both to construct and keep in repair, and prevents the free cultivation of the surface, causing a large extent of unavailable land. The necessity of so much fencing is generally urged in consequence of the necessity for confining cattle to particular fields. To prevent cattle straying tedders have been employed, generally consisting of a rope or chain extending from a stake in the ground to the animal's head. This is not found practically to answer, as the rope or chain laying on the ground often becomes wound up or entangled in the animal's legs, and in their efforts to extricate themselves they are often seriously injured.

The nature of my said invention consists in a tedder rope or chain stretched overhead, and provided with a weight or spring, so as to yield to the animal that may be connected thereto for preventing injury to such tedder-rope, and for taking up any slack to keep the tedder-rope and the halter or leading rope from becoming entangled in the animal's feet, or otherwise, and, combined with such yielding tedder-rope, I employ check-bars and a swivel-ring, so that the halter or rope cannot become twisted, and the animal cannot go so near to the posts supporting the tedder-rope as to become entangled in them, and I place a series of said posts at suitable distances apart to receive the tedder-ropes that keep the cattle from straying or coming too near each other when grazing. Thereby the animal is prevented from straying, is always in a position where it can be taken and led away. Hence does not become so wild and unmanageable as when let to run at large, and animals can be fed without requiring any fences for their restraint. Hence the cost of such fences is avoided, and the animals can be confined to any desired portion of the pasture without any risk of their getting to the crops.

The field to be used for pasture is to be divided off by any desired number of posts or rows of posts, which I prefer should be fifty feet apart in one direction and twenty feet apart in the other direction. These posts are to be sufficiently strong and higher than the animals to be pastured. I have illustrated the position of these posts $a\ a$ in Fig. 2. I extend from one post to the next a rope or chain forming a tedder, and to this the animal to be pastured is attached. The said rope is to be sufficiently high for the animal to pass beneath it, and to this rope or chain the halter or leading rope or strap is to be connected. If this rope were tied to the posts $a\ a$ or other point of support at both ends, the atmospheric changes would cause the same to tighten or to hang slackly, and it might become entangled in the animal, or be easily broken by any sudden movement of such animal. I have therefore provided this rope or chain $b$ with a loop, $c$, at one end, taking a hook, $d$, in the post, and passed the other end through a sheave or block, $f$, and attached a weight, $e$. The sheave or block $f$ may be of any desired character, and is fixed upon or connected to the post $a$, and the weight $e$ is only sufficient to keep said rope $b$, out nearly straight. If now the halter or leading rope $h$ be tied in a loop over this rope $b$, or attached to a ring upon the same, so that the animal in putting his head to the ground draws the rope $b$ slightly down, the weight $e$ will always draw up the said halter as the head is raised and keep it from beneath the animal's feet, and he can feed from one post to the next, the halter, loop, or rings sliding on the rope $b$, and on an area of pasture, the width of which is regulated by the length to which the halter and rope $b$ will extend each side of the posts when the weight $e$ is drawn up to its sheave or block. Check bars or stops $g$ are introduced through loops or knots in the rope $b$, in such a position that the animal cannot approach too near or become entangled by passing around either of the posts $a$, the ring $i$ or loop on the halter $h$ being stopped by said check-bar $g$ from sliding too far. The ring $i$ should be made as a swivel, and the halter, leading rope, or strap, fastened to the animal in any convenient way, is to be tied or otherwise connected to this ring. I have shown in Fig. 1 said halter $h$ as passing to the nose-band on a horse; but it may be attached to the horns of a cow or fitted in any other convenient way. It will be apparent that the animal is not in any way hindered from feeding with ease because the weight $e$ is only sufficient to hold up the rope or halter $h$ by the rope $b$, and hence any movement of the animal is easily allowed in any direction within the limit of the length of the rope, and it is impossible when properly fitted for the tedder to become entangled. The ranges of posts being sufficiently far apart to prevent the cattle as they feed coming up to each other, all entangling is prevented, and the animals can be placed between different posts each day, so as to feed successively on the different parts of the field. Thus the straying of the animals is prevented, the pasture is not trodden down, the animals are always in position when required; fences are dispensed with, and only as many lines, weights, pulleys, and halters are required as there are animals to be pastured, and the posts can easily be taken up and removed or reset when desired.

If desired, a spring might be employed to take up the slack of the rope instead of the weight $e$.

The swivel-ring on the rope $b$ is very beneficial, as it prevents the halter or leading rope from becoming twisted or kinked by the movement of the animal, and thereby entangled.

What I claim, and desire to secure by Letters Patent, is—

1. An elevated tedder sustained by posts, so that animals may feed under the same, in combination with a spring or weight by means of which the said tedder is allowed to yield to the movement of the animal or the slack of the rope taken up, as specified.

2. In combination with the said yielding tedder, the stop-bars $g$, for the purposes specified.

3. In combination with the said yielding tedder the swivel sliding ring $i$ to receive the leading rope or halter, as specified.

4. A series of posts arranged in rows as specified, to receive and sustain the yielding tedder above the animals grazing, for the purposes and as set forth.

GEORGE F. JEROME.

Witnesses:
LEMUEL W. SERRELL,
THOS. GEO. HAROLD.